(12) United States Patent
Peng et al.

(10) Patent No.: US 8,643,600 B2
(45) Date of Patent: Feb. 4, 2014

(54) COMPUTER MOUSE HAVING ILLUMINATING FUNCTION

(75) Inventors: Zheng-Quan Peng, Shenzhen (CN); Guo-Feng Zhang, Shenzhen (CN); Hai-Qing Zhou, Shenzhen (CN); Yi-Xin Tu, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 94 days.

(21) Appl. No.: 13/231,974

(22) Filed: Sep. 14, 2011

(65) Prior Publication Data

US 2013/0027304 A1    Jan. 31, 2013

(30) Foreign Application Priority Data

Jul. 29, 2011    (CN) .......................... 2011 1 0215753

(51) Int. Cl.
*G06F 3/03543*    (2013.01)

(52) U.S. Cl.
USPC ......................................... 345/163; 345/156

(58) Field of Classification Search
USPC .................................. 345/156–183
See application file for complete search history.

(56) References Cited

U.S. PATENT DOCUMENTS

| | | | | |
|---|---|---|---|---|
| 6,043,807 | A * | 3/2000 | Carroll | 345/163 |
| 6,794,849 | B2 * | 9/2004 | Mori et al. | 320/107 |
| 2005/0156887 | A1 * | 7/2005 | Chen | 345/163 |
| 2007/0223214 | A1 * | 9/2007 | Yen | 362/118 |
| 2011/0084906 | A1 * | 4/2011 | Wu | 345/163 |

* cited by examiner

*Primary Examiner* — Abbas Abdulselam
*Assistant Examiner* — Irasema Gonzalez
(74) *Attorney, Agent, or Firm* — Altis Law Group, Inc.

(57) ABSTRACT

A mouse includes a casing, a light, a switch, and a supporting device. The casing includes a base plate and a top cover covering the base plate. The top cover defines a receiving hole. The switch is electrically connected to the light and used to turn the light on and off. The supporting device is movably accommodated in the receiving hole and supports the light. The supporting device is capable of moving out of the receiving hole.

5 Claims, 4 Drawing Sheets

COMPUTER MOUSE HAVING ILLUMINATING FUNCTION

BACKGROUND

1. Technical Field

The present disclosure relates to computer mouses and, particularly, to a mouse having illuminating functions.

2. Description of Related Art

It is very difficult to distinguish characters printed on a keyboard of a computer in a dark environment, and thus users cannot easily operate the keyboard.

Therefore, it is desirable to provide a mouse that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
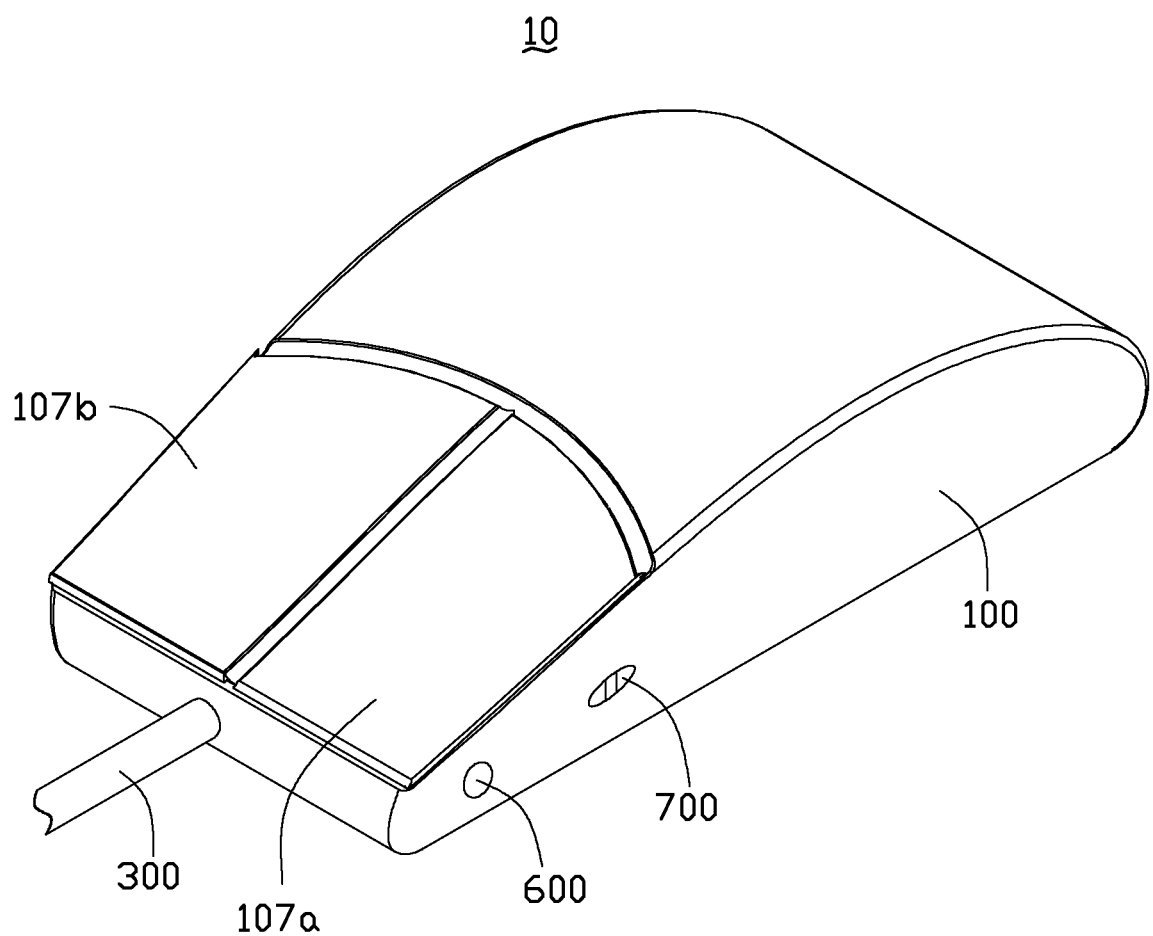
FIG. 1 is a schematic view of a mouse including a light, according to an exemplary embodiment, showing the light in a first state.
Figure 2:
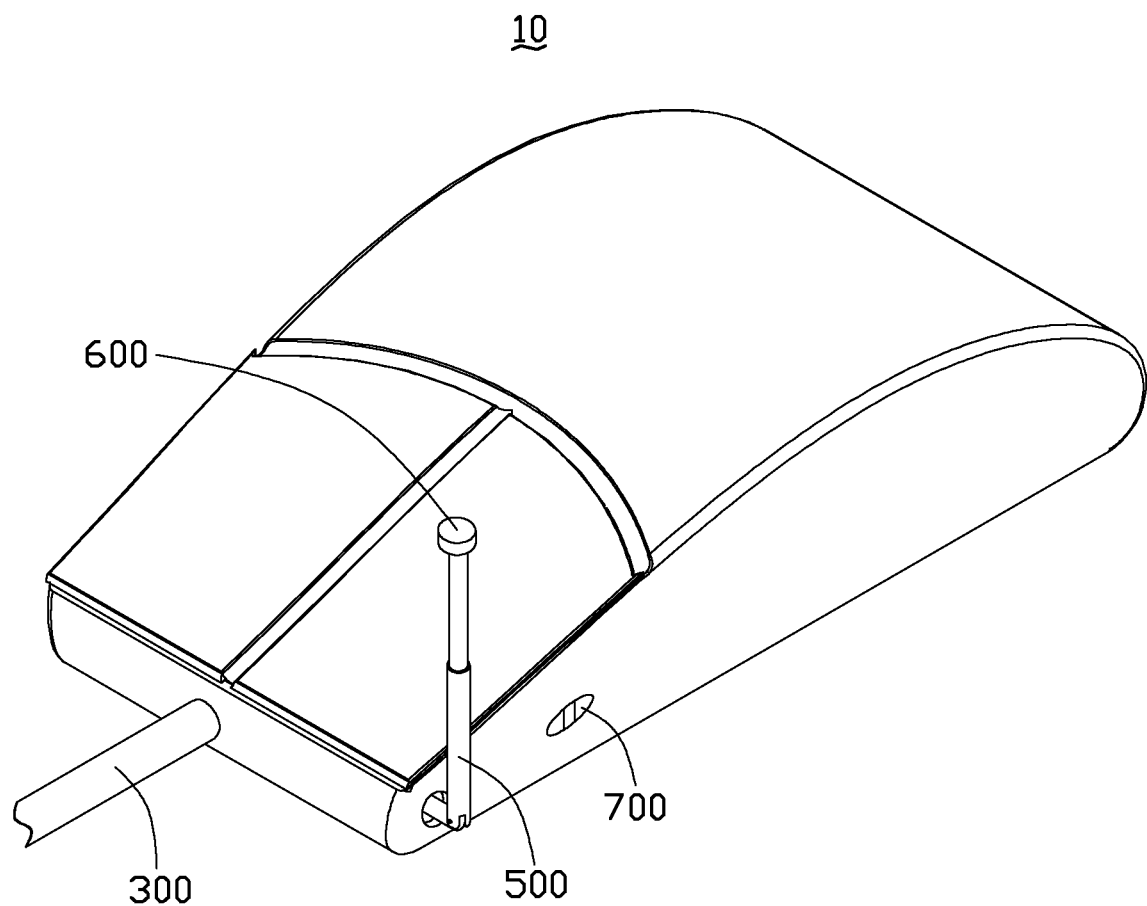
FIG. 2 is similar to FIG. 1, but showing the light in a second state.
Figure 3:
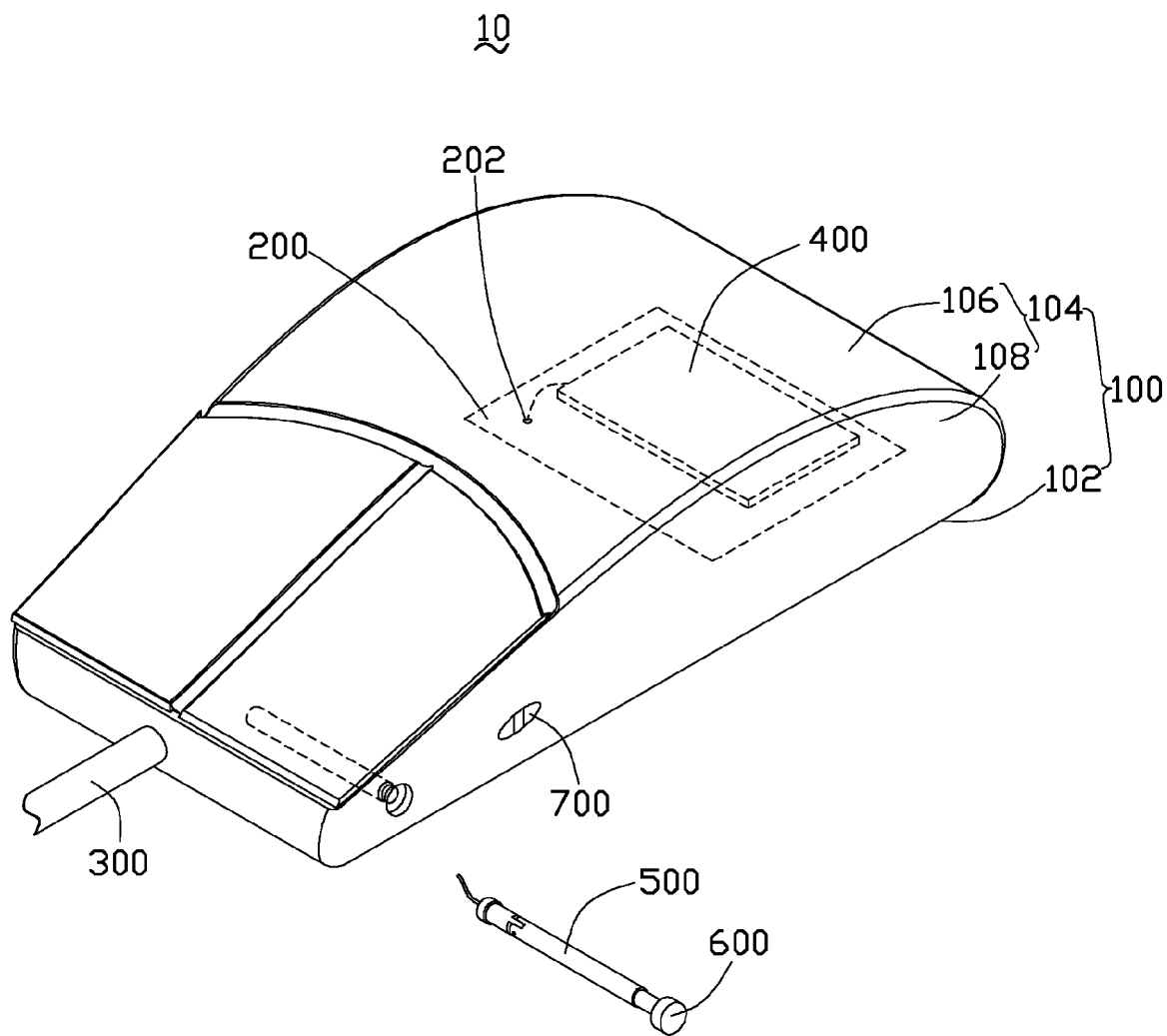
FIG. 3 is a partially exploded view of the mouse of FIG. 1.

Referring to FIGS. 1-3, a mouse 10, according to an embodiment, includes a casing 100, a printed circuit board (PCB) 200, a cable 300, a battery 400, a supporting device 500, a light 600, and a switch 700.

Figure 4:
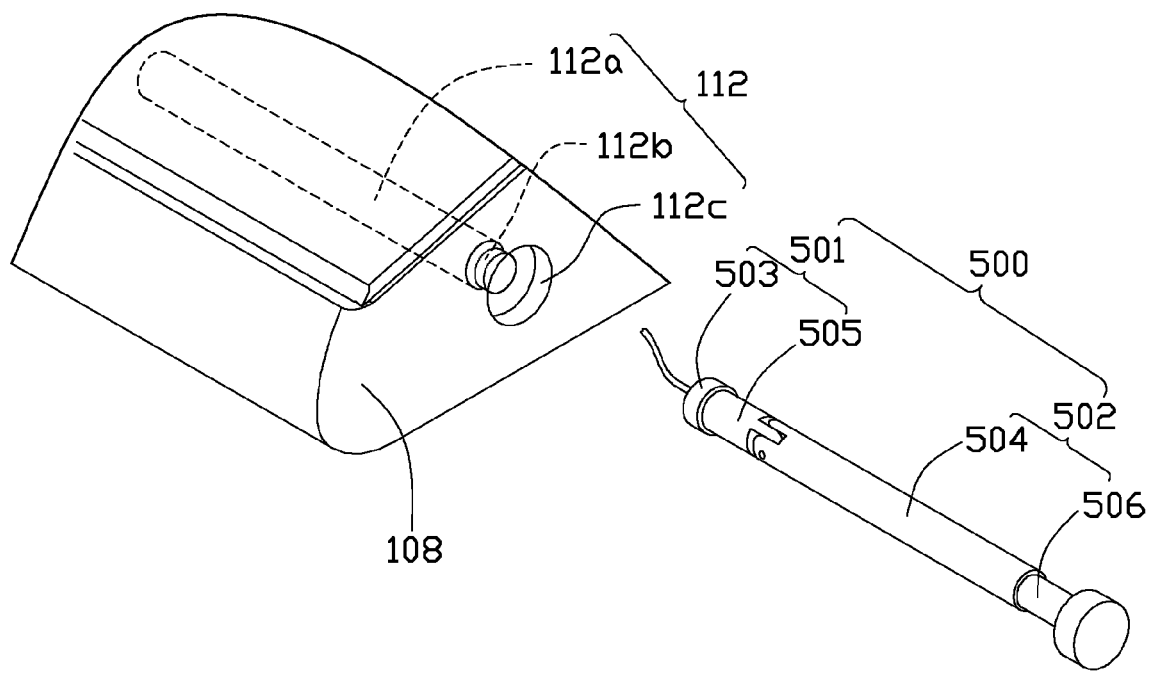
FIG. 4 is a partially enlarged view of the mouse of FIG. 3.

Also referring to FIG. 4, the casing 100 is hollow, and includes a bottom plate 102 and a cover 104. The cover 104 includes a top plate 106, a left-mouse-click key 107a, a right-mouse-click key 107b, and a side plate 108. The side plate 108 defines a cylinder-shaped receiving hole 112 adjacent to the left-mouse-click key 107a. The receiving hole 112 includes a first hole portion 112a, a second hole portion 112b, and a third hole portion 112c from inwards to outwards. The diameter of the first hole portion 112a is larger than that of the second hole portion 112b. The third hole portion 112c is shaped for receiving the light 600.

The PCB 200 is received in the casing 100, and includes a power end 202 electrically connected to the cable 300, and thus the PCB 200 is electrically connected to a computer (not shown). When the cable 300 is electrically connected to the computer, the power end 202 obtains working power for the PCB 200. The battery 400 is received in the casing 100, and is electrically connected to the power end 202, and can be charged by the computer.

The supporting device 500 includes a cylindrical fixing portion 501 and an extending portion 502. The fixing portion 501 includes a fixing end 503 and a connecting end 505. The diameter of the fixing end 503 is substantially equal to that of the first hole portion 112a. The diameter of the connecting end 505 is less than that of the fixing end 503, and slightly smaller than that of the second hole portion 112b. The fixing end 503 can slide along the axial direction in the receiving hole 112 and can rotate in the receiving hole 112. The connecting end 505 can slide to extend from the receiving hole 112.

The extending portion 502 includes a cylinder-shaped first pipe 504 and a cylinder-shaped second pipe 506. The diameter of the first pipe 504 is larger than that of the second pipe 506. The diameter of the first pipe 504 is substantially equal to that of the connecting end 505. One end of the first pipe 504 is rotatably connected to the connecting end 505. The second pipe 506 is partially received in the first pipe 504 and can slide in the first pipe 504. The light 600 is electrically connected to one end of the second pipe 506 extending outwards from the first pipe 504. The frictional force between the first pipe 504 and the second pipe 506 is larger than that between the fixing end 503 and the inner sidewall of the receiving hole 112. Thus, the supporting device 500 can be telescopically extended, rotated, and pivoted to aim the light 600 to illuminate as desired.

The switch 700 is arranged on the side plate 108, and is electrically connected to the light 600, the power end 202, and the battery 400, and can be used to turn the light 600 on and off. In this embodiment, the switch 700 has a first position, a second position, and a third position. When the switch 700 is in the first position, the light 600 is electrically connected to the power end 202 and turns on. When the switch 700 is in the second position, the light 600 is turned off. When the switch 700 is in the third position, the light 600 is electrically connected to the battery 400 and turns on. In this embodiment, the light 600 is a light emitting diode (LED) with high brightness.

In use, when the cable 300 is electrically connected to the computer, the mouse is powered on and the battery 400 can be automatically charged as needed. When a user wants to use the light 600 they can simply pull the support 500 to extend from the hole 112 and pivot and rotate the light 600 to aim it as desired and set the switch 700 to the first position. Even when the mouse is not connected to the computer, the light may be used by setting the switch 700 to the third position so that it can run on battery 400 power.

The receiving hole 112 is defined in the side plate 108 adjacent to the left-mouse-click key 107a to prevent the receiving hole 112 from being shielded by the user's hand when the user operates the mouse 10. The switch 700 is disposed on the side plate 108 away from the cable 300 convenient for the user to operate.

In other embodiments, the location of the receiving hole 112 and the switch 700 is not limited to this embodiment. For example, the switch 700 may be disposed on the top plate 106 out of the way of the user's hand, and thus the fixing portion 501 for rotating the extending portion 502 can be omitted.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A mouse comprising:
  a casing, comprising:
    a base plate; and
    a top cover covering the base plate and defining a receiving hole, the receiving hole comprising a first hole portion, a second hole portion, and a third hole portion arranged from innermost to outermost, the diameter of the first hole portion being larger than that of the second hole portion;

a light, the light being capable of being received in the third hole portion;

a switch electrically connected to the light and positioned on the top cover for turn the light on and off; and a supporting device movably accommodated in the receiving hole and supporting the light, the supporting device capable of being moved out of the receiving hole, the supporting device comprising a fixing end, a connecting end connected to the fixing end, and an extending portion, the fixing end being capable of moving in the receiving hole, the diameter of the fixing end being substantially equal to that of the first hole portion, the connecting end being capable of sliding out of the receiving hole, the diameter of the connecting end being less than that of the fixing end, and slightly smaller than that of the second hole portion, the extending portion comprising a first pipe and a second pipe, the diameter of the first pipe being larger than that of the second pipe, the diameter of the first pipe being substantially equal to that of the connecting end, one end of the first pipe being rotatably connected to the connecting end, the second pipe being partially received in the first pipe and capable of sliding in the first pipe, the light being electrically connected to one end of the second pipe extending outwards from the first pipe.

2. The mouse of claim 1, wherein a frictional force between the first pipe and the second pipe is larger than that between the fixing end and an inner sidewall of the receiving hole.

3. The mouse of claim 2, wherein the top cover comprises a top plate, a left-mouse-click key, and a side plate adjacent to the left-mouse-click key, the receiving hole is defined on the side plate adjacent to the left-mouse-click key.

4. The mouse of claim 2, wherein the mouse further comprises a cable, a power end, and a battery, the cable is configured for electrically connecting the mouse to a computer, the power end is electrically connected to the cable, and is configured for supplying power to the mouse, the switch is electrically connected to the power end and the battery and capable of selecting one of the power end and the battery to supplying power to the mouse.

5. The mouse of claim 4, wherein the battery is further electrically connected to the power end, the power end is further configured for charging the battery.

* * * * *